United States Patent
Lin et al.

(10) Patent No.: US 8,554,276 B2
(45) Date of Patent: Oct. 8, 2013

(54) APPARATUS AND METHOD FOR CONTROLLING SUBSCRIBER IDENTITY MODULE CARD

(75) Inventors: Chih-Yung Lin, Hsinchu Hsien (TW); Cheng-Yuan Lo, Hsinchu Hsien (TW); Yi-Wei Wang, Hsinchu Hsien (TW); Jui-Hsiang Chang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 671 days.

(21) Appl. No.: 12/472,075

(22) Filed: May 26, 2009

(65) Prior Publication Data
US 2010/0105433 A1    Apr. 29, 2010

(30) Foreign Application Priority Data

Oct. 28, 2008    (TW) .............................. 97141443 A

(51) Int. Cl.
*H04M 1/00*    (2006.01)
(52) U.S. Cl.
USPC ........................................ 455/558; 370/338
(58) Field of Classification Search
USPC ....................................................... 455/558
See application file for complete search history.

(56) References Cited

U.S. PATENT DOCUMENTS

| 8,121,643 B2 * | 2/2012 | Lin et al. ........................ 455/558 |
| 2007/0283057 A1 * | 12/2007 | Brumfield ........................ 710/62 |
| 2009/0088211 A1 * | 4/2009 | Kim .............................. 455/558 |
| 2009/0270130 A1 * | 10/2009 | Lee et al. ........................ 455/558 |
| 2009/0287864 A1 * | 11/2009 | Brumfield ........................ 710/105 |
| 2011/0207506 A1 * | 8/2011 | Haugli et al. ..................... 455/558 |

FOREIGN PATENT DOCUMENTS

| CN | 2478288 | 2/2002 |
| CN | 101257674 | 9/2008 |

OTHER PUBLICATIONS

China OA issued on Oct. 9, 2011.

* cited by examiner

*Primary Examiner* — Marcos Batista
*Assistant Examiner* — Frank Donado
(74) *Attorney, Agent, or Firm* — WPAT, PC; Justin King

(57) ABSTRACT

A Subscriber Identity Module (SIM) card control apparatus applied to a mobile communication device is provided. The mobile communication device has a first SIM card and a second SIM card. The SIM card control apparatus includes a judgment unit, a SIM card controller and a switch device. The judgment unit is used to generate a selection signal according to a to-be-accessed SIM card among the first and the second SIM cards. The SIM card controller transmits signals via a group of signal lines. The switch device is used to selectively connect the group of signal lines to the first SIM card or the second SIM card according to the selection signal.

2 Claims, 5 Drawing Sheets

APPARATUS AND METHOD FOR CONTROLLING SUBSCRIBER IDENTITY MODULE CARD

CROSS REFERENCE TO RELATED PATENT APPLICATION

This patent application is based on a Taiwan, R.O.C. patent application No. 97141443 filed on Oct. 28, 2008.

FIELD OF THE INVENTION

The present invention relates to a mobile communication device, and more particularly, to a Subscriber Identity Module (SIM) card control apparatus and a SIM control method.

BACKGROUND OF THE INVENTION

Refer to FIG. 1 showing a schematic diagram of a SIM card control apparatus controlling a SIM card. Generally, a mobile phone uses a SIM card control apparatus 122 to control a SIM card 20. In a mobile phone communication system, such as a Global System for Mobile communications (GSM) system, phone number information of the mobile phone is recorded in the SIM card, which is given to a subscriber by a mobile phone service provider. When the SIM card is plugged into a SIM card slot of the mobile phone and the mobile phone is powered on, the SIM card control apparatus 122 activates the SIM card 20 to enable the mobile phone to hook onto the mobile network service.

As mobile phones prevail, more and more people have two or even several mobile phone numbers. Each of the numbers has a corresponding SIM card and usually one mobile phone accommodates only one SIM card. Therefore, people having several phone numbers have to simultaneously carry several mobile phones to receive phone calls or messages of the phone numbers. In order to solve the problem that a user has to carry several mobile phones, a mobile phone capable of accommodating two SIM cards while maintaining both of the different phone numbers in the standby mode has become available to the market.

Refer to FIG. 2 showing a schematic diagram of using two SIM card controllers to control two SIM cards in the prior art. A conventional mobile phone capable of accommodating two SIM cards has a SIM card controller 122 and a SIM card controller 124, which are used for controlling a SIM card 20 and a SIM card 30 respectively, so as to receive phone calls or messages of the two phone numbers. However, this method can only be implemented by applying two SIM card controllers to a dual-card mobile phone, and hence production cost of the mobile phone is increased.

SUMMARY OF THE INVENTION

The present invention relates to a SIM card control apparatus and a SIM card control method. The SIM card control apparatus and the SIM card control method preferably utilize a switch mechanism to control two SIM cards, so that only one SIM card controller is used for controlling two SIM cards in a mobile communication device and production cost is effectively reduced.

According to the present invention, a SIM card control apparatus disposed in a mobile communication device is provided. The mobile communication device has a first SIM card and a second SIM card. The SIM card control apparatus comprises a judgment unit, a SIM card controller and a switch device. The judgment unit generates a selection signal according to a to-be-accessed SIM card among the first and second SIM cards. The SIM card controller transmits signals via a group of signal lines. The switch device connects the group of signal lines to the first SIM card or the second SIM card according to the selection signal.

A SIM card control method applied to a mobile communication device having a first SIM card and a second SIM card is provided according to the present invention. The SIM card control method comprises steps of generating a selection signal according to a to-be-accessed SIM card among the first and second SIM cards, providing a clock signal and a data signal, and selectively transmitting the clock signal and the data signal to the first SIM card or the second SIM card according to the selection signal.

Following description and figures are disclosed to gain a better understanding of the advantages of the present invention.

DETAILED DESCRIPTION OF THE PREFERRED EMBODIMENT

Figure 1:
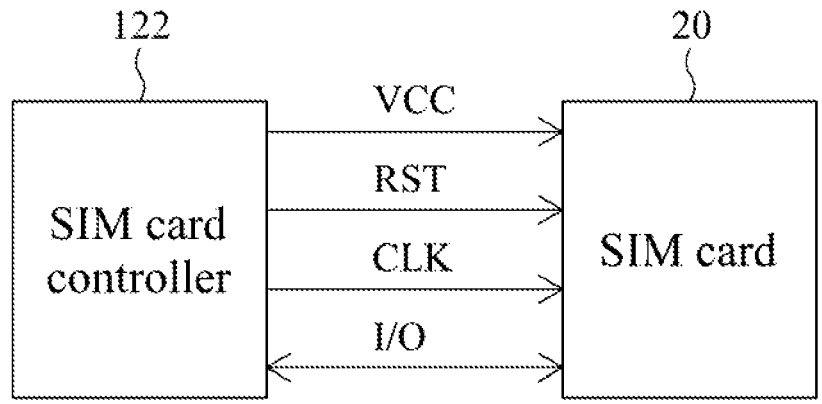
FIG. 1 is a schematic diagram of a SIM card controller controlling a SIM card.
Figure 2:
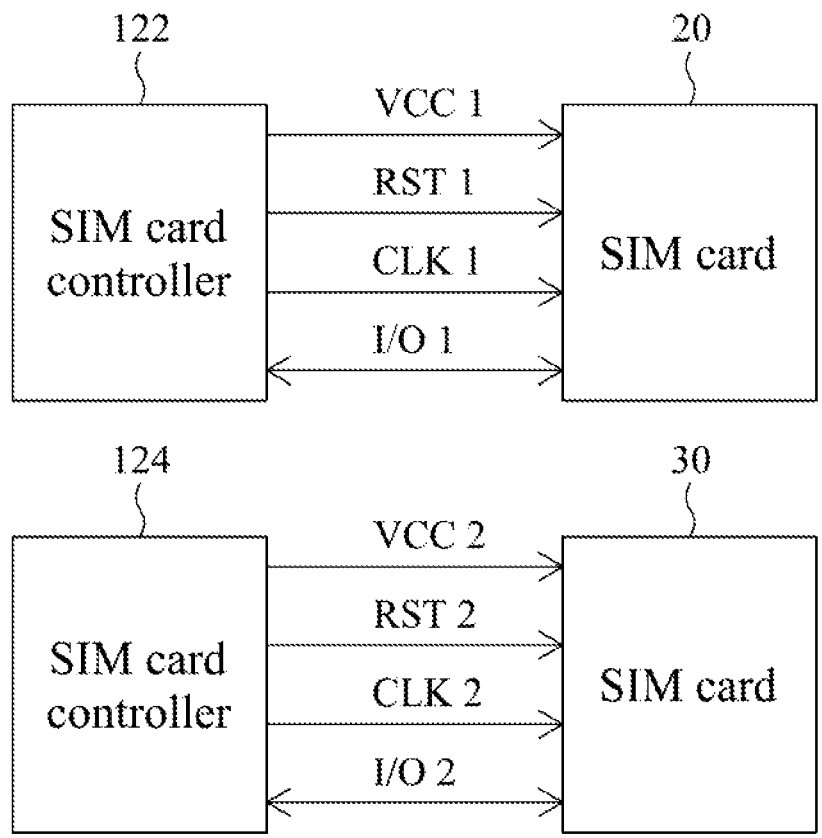
FIG. 2 is a schematic diagram of using two SIM card controllers to control two SIM cards respectively.
Figure 3:
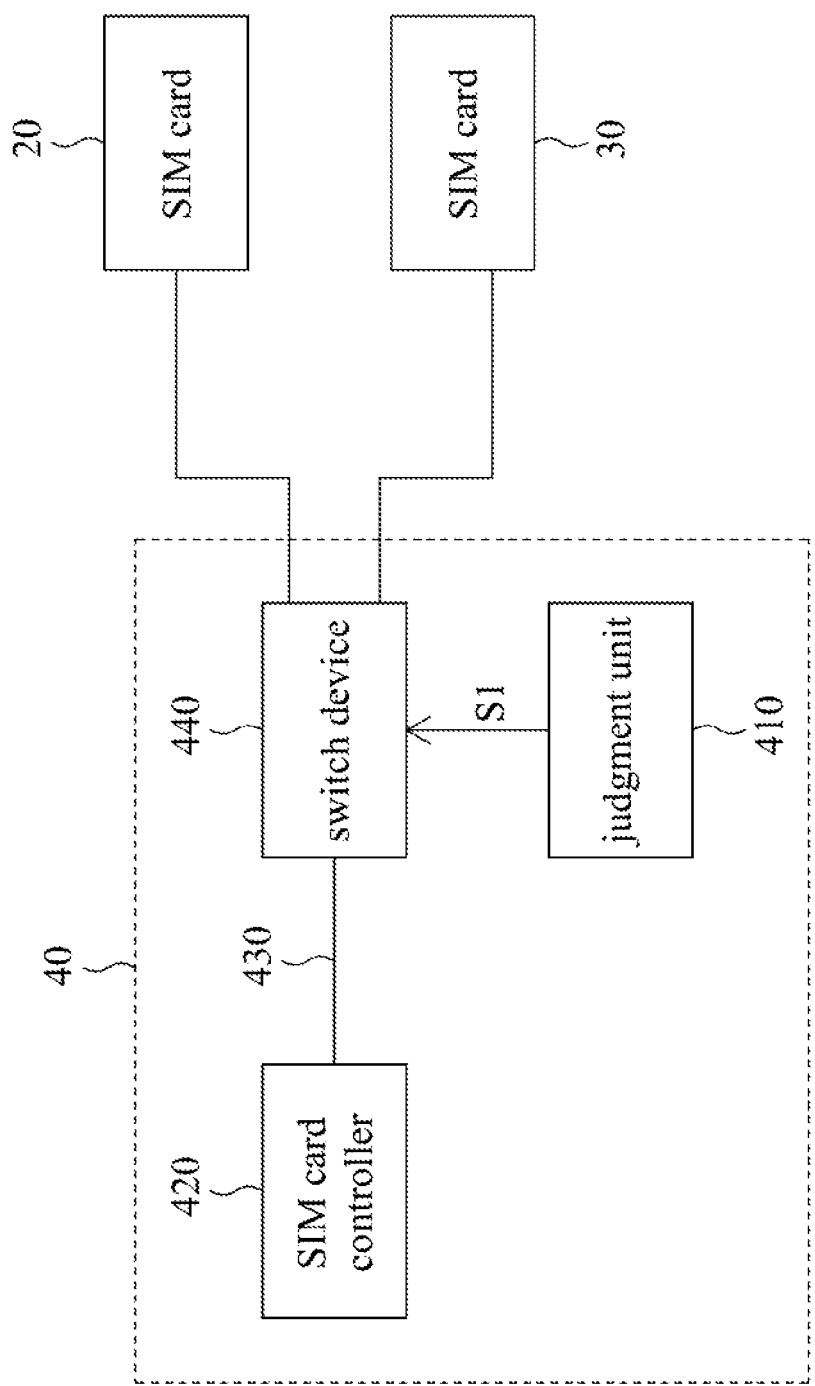
FIG. 3 is a schematic diagram of a SIM card control apparatus according to an embodiment of the present invention.

Refer to FIG. 3 showing a schematic diagram of a SIM card control apparatus according to an embodiment of the present invention. A SIM card control apparatus 40 comprises a judgment unit 410, a SIM card controller 420, and a switch device 440. The SIM card control apparatus 40 is disposed in a mobile communication device which is not illustrated in FIG. 3, to control a SIM card 20 and a SIM card 30.

In the SIM card control apparatus 40, the judgment unit 410 is used to generate a selection signal S1. The SIM card controller 420 is used to generate a control signal of a SIM card, and transmits the control signal to the switch device 440 via a signal line 430. The switch device 440 connects the signal line 430 to the SIM card 20 or the SIM card 30 according to the selection signal S1, so as to transmit the control signal to the SIM card 20 or the SIM card 30. For example, when the mobile communication device wants to access data stored in the SIM card 20, the judgment unit 410 generates a selection signal S1 corresponding to the SIM card 20. The switch device 440 then transmits a control signal generated by the SIM card controller 420 to the SIM card 20 according to the selection signal S1, so as to access the data stored in the SIM card 20. Similarly, when the mobile communication device wants to access data stored in the SIM card 30, the judgment unit 410 generates a selection signal S1 corresponding to the SIM card 30. The switch device 440 then transmits a control signal generated by the SIM card controller 420 to the SIM card 30 according to the selection signal S1, so as to access the data stored in the SIM card 30.

Figure 4:
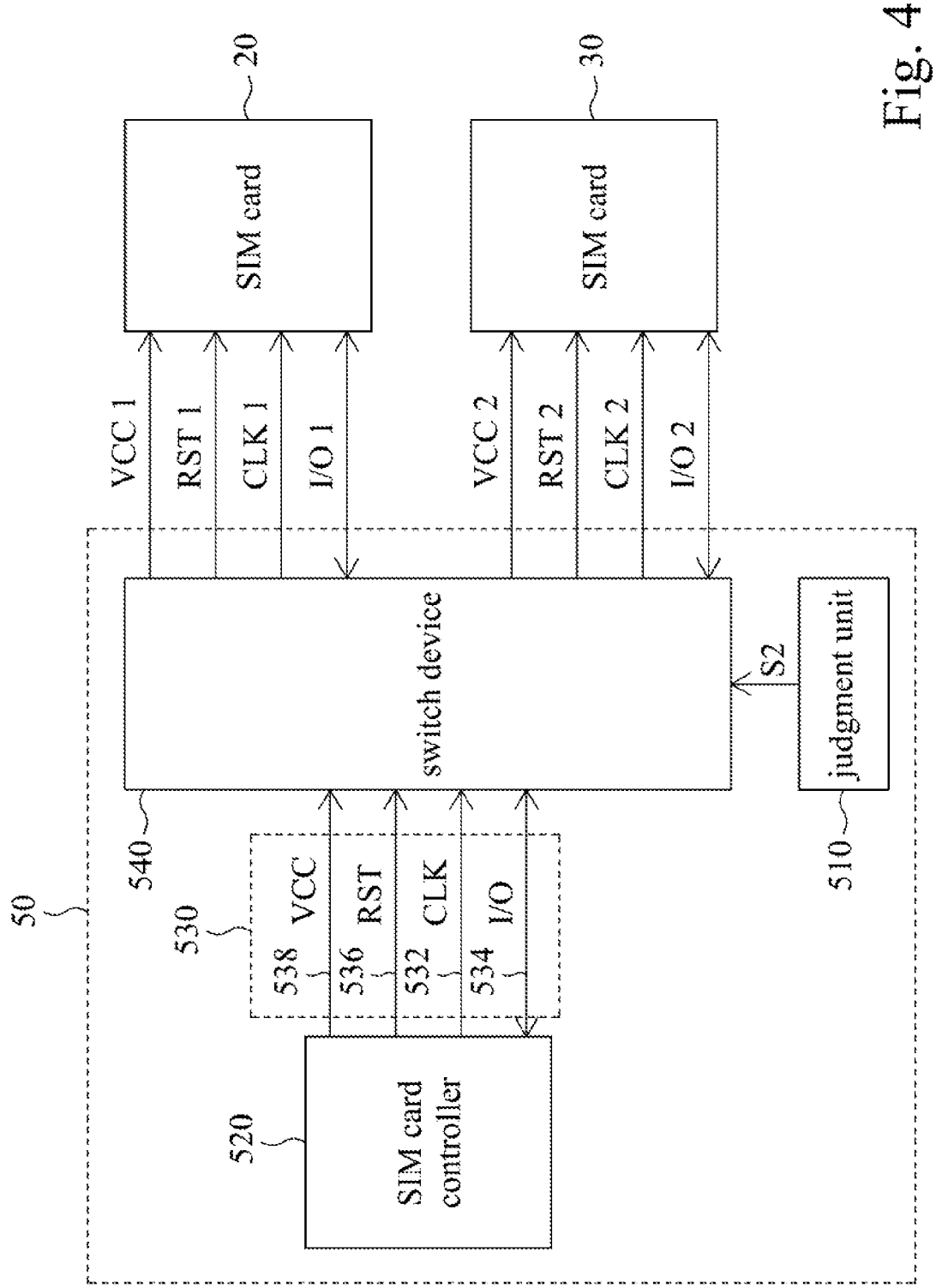
FIG. 4 is a schematic diagram of a SIM card control apparatus according to a preferred embodiment of the present invention.

Refer to FIG. 4 showing a schematic diagram of a SIM card control apparatus according to a preferred embodiment of the present invention. A group of signal lines 530 of the SIM card control apparatus 50 comprises a clock signal line 532, a data signal line 534, a reset signal line 536 and a power line 538. A SIM card controller 520 generates a clock signal CLK needed by the SIM card 20 and the SIM card 30 to operate, and the clock signal CLK is outputted via the clock signal line 532. The data signal line 534 is used to transmit a data signal I/O between the SIM card 20 or the SIM card 30 and the SIM card controller 520. For example, the data signal I/O is input/output data. The reset signal line 536 is used to transmit a reset signal RST provided by the SIM card controller 520, wherein the reset signal RST is used to reset the SIM card 20 and the SIM card 30. The power line 538 is used to provide a power supply VCC needed by the SIM card 20 and the SIM card 30 to operate.

In an embodiment, the SIM card control apparatus 50, the SIM card 20 and the SIM card 30 are disposed in a mobile communication device which is not illustrated in FIG. 4. The judgment unit 510 generates a selection signal S2 according to a SIM card to be accessed by the mobile communication device among the SIM card 20 and the SIM card 30. The switch device 540 electrically connects, selectively, the SIM card controller 520 to the SIM card 20 or SIM card 30 according to the selection signal S2. For example, the judgment unit 510 is formed by a microprocessor by executing software, and a SIM card to be accessed by the mobile communication device is determined by executing specific software by the microprocessor, so as to generate an appropriate selection signal. In an embodiment, when the mobile communication device has requests of simultaneously accessing the SIM card 20 and the SIM card 30, the judgment unit 510 such as a microprocessor further performs arbitration to determine the access sequence. For example, when two requests of the mobile communication device wanting to send a message to the SIM card 20 and an incoming phone call wanting to set up a call connection with the SIM card 30 are received concurrently, the judgment unit 510 determines to access the SIM card 30 for the reason that setting up the call connection has a higher priority. The switch device 540 exemplarily is a switch or a multiplexer to selectively connect the SIM card controller 520 to the SIM card 20 or SIM card 30 according to the selection signal S2.

For example, when the mobile communication device wants to access data stored in the SIM card 20, the judgment unit 510 generates a selection signal S2 corresponding to the SIM card 20. The switch device 540 then switches to the SIM card 20 according to the selection signal S2 to connect the group of signal lines 530 to the SIM card 20. The clock signal CLK, the reset signal RST and the power supply VCC outputted by the SIM card controller 520 are transmitted to the SIM card 20 via the group of signal lines 530. After having received the clock signal CLK, the reset signal RST and the power supply VCC, the SIM card 20 begins to operate. At this point, the data signal I/O can be transmitted between the SIM card controller 520 and the SIM card 20 via the data signal line 534 of the group of signal lines 530.

Similarly, when the mobile communication device wants to access data stored in the SIM card 30, the judgment unit 510 generates a selection signal S2 corresponding to the SIM card 30, so as to switch the switch device 540 to the SIM card 30. The clock signal CLK, the reset signal RST and the power supply VCC outputted by the SIM card controller 520 are transmitted to the SIM card 30 via the group of signal lines 530. The data signal I/O is transmitted between the SIM card controller 520 and the SIM card 30 via the data signal line 534 of the group of signal lines 530.

In an embodiment, the SIM card controller 520 further provides different clock signals CLK, reset signals RST, data signals I/O and power supplies VCC according to the SIM card to be accessed by the mobile communication device. For example, when the mobile communication device wants to access the SIM card 20, the SIM card controller 520 provides a first clock signal CLK1, a first reset signal RST1, and a first power supply VCC1 to the SIM card 20. When the mobile communication device wants to access the SIM card 30, the SIM card controller 520 provides a second clock signal CLK2, a second reset signal RST2, and a second power supply VCC2 to the SIM card 30.

Figure 5:
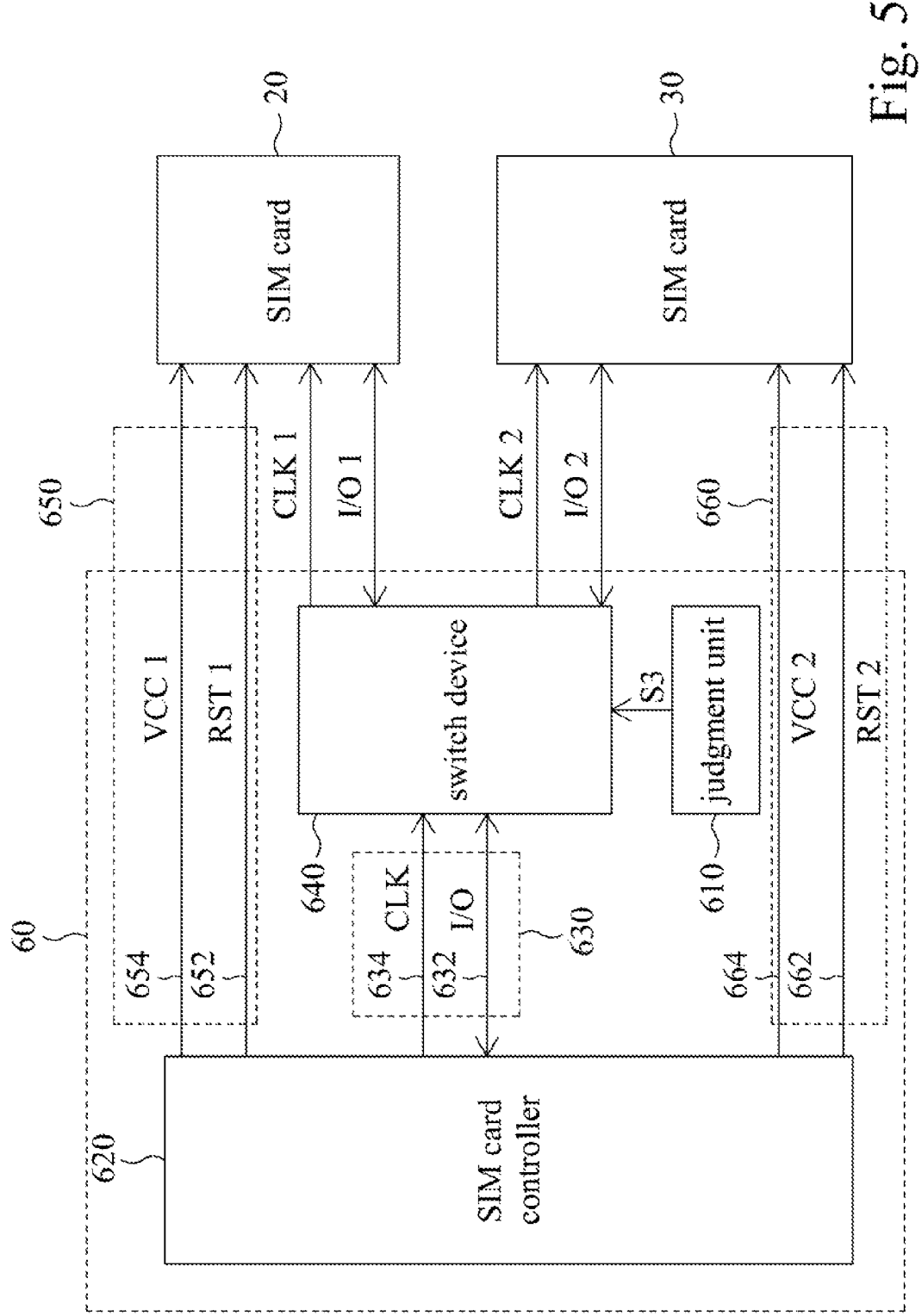
FIG. 5 is a SIM card control apparatus according to another preferred embodiment of the present invention.

Refer to FIG. 5 showing a schematic diagram of a SIM card control apparatus according to another preferred embodiment of the present invention. In the SIM card control apparatus 60, the group of signal lines 630 comprises a clock signal line 632 and a data signal 634. The switch device 640 selectively connects the group of signal lines 630 to the SIM card 20 or the SIM card 30 according to a selection signal S1 generated by the judgment apparatus 610. In addition, the SIM card control apparatus 60 is further coupled to the SIM card 20 and the SIM card 30 via the group of signal lines 650 and the group of signal lines 660 respectively. The group of signal lines 650 comprises a reset signal line 652 and a power line 654, and the group of signal lines 660 comprises a reset signal line 662 and a power line 664. In this embodiment, the SIM card controller 620 directly provides the reset signal RST1 and the power supply VCC1 to the SIM card 20 via the group of signal lines 650. Moreover, the SIM card controller 620 directly provides the reset signal RST2 and the power supply VCC2 to the SIM card 30 via the group of signal lines 660. Consequently, the SIM card 20 and the SIM card 30 remain in the ready state. After the SIM card 20 or the SIM card 30 receives a clock signal, the SIM card 20 and the SIM card 30 can quickly enter a normal operating state.

Figure 6:
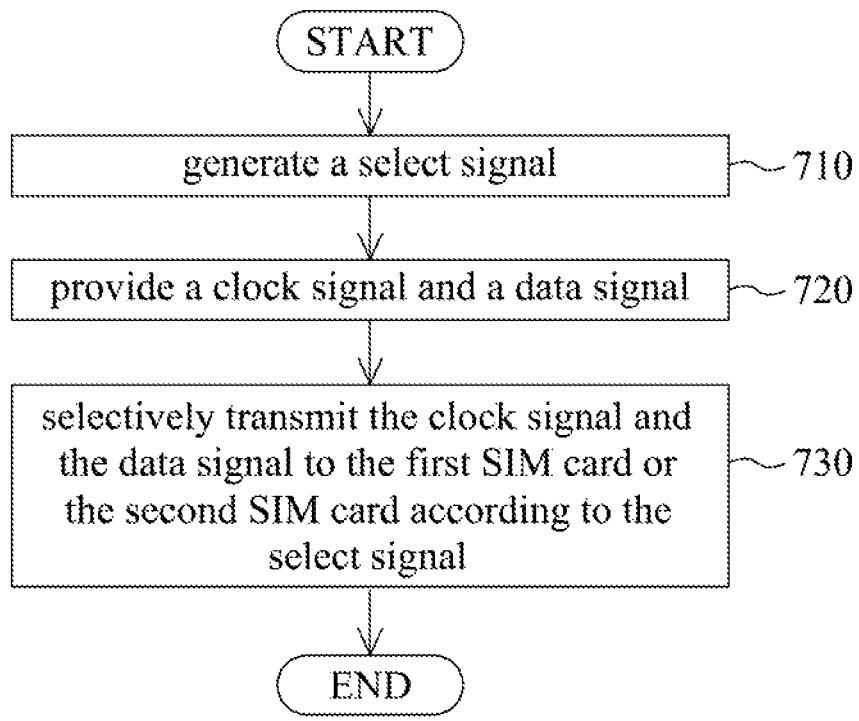
FIG. 6 is a flow chart of a SIM card control method according to a preferred embodiment of the present invention.

Refer to FIG. 6 showing a flow chart of a SIM card control method according to a preferred embodiment of the present invention. The SIM card control method is applied to a mobile communication device having a first SIM card and a second SIM card. The SIM card control method comprises steps as below.

In step S710, a selection signal is generated according to a SIM card to be accessed by the mobile communication device among the first and the second SIM cards. In step S720, a clock signal and a data signal are provided. For example, the data signal is the foregoing input/output data I/O. In step S730, the clock signal and the data signal are selectively transmitted to the first SIM card or the second SIM card according to the selection signal.

In step S730, when the clock signal and the data signal are transmitted to the first SIM card, the clock signal is equal to a first clock, and when the clock signal and the data signal are transmitted to the second SIM card, the clock signal is equal to a second clock.

In an embodiment, the SIM card control method according to the present invention further comprises transmitting a reset signal and a power supply to the first SIM card or the second SIM card according to the selection signal.

The SIM card control apparatus and the SIM card control method according to the foregoing embodiments of the present invention preferably utilize a switch mechanism to control two SIM cards, so that only one SIM card controller is used for controlling two SIM cards in a mobile communication device and production cost is effectively reduced.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A SIM card control apparatus, applied to a mobile communication device having a first SIM card and a second SIM card, the SIM card control apparatus comprising:
    a judgment unit, for generating a selection signal according to a to-be-accessed SIM card among the first and the second SIM cards;
    a first group of signal lines comprising a main clock signal line and a main data signal line;
    a SIM card controller, for transmitting signals via the first group of signal lines; and
    a switch device, electrically connected to the SIM card controller via the first group of signal lines, for selectively connecting the SIM card controller to the first SIM card or the second SIM card via the first group of signal lines according to the selection signal;
    wherein the SIM card controller is further directly connected to the first SIM card via a second group of signal lines comprising:
        a first power line for providing a first power supply to the first SIM card; and
        a first reset signal line for transmitting a first reset signal provided by the SIM card controller to the first SIM card;
    wherein the SIM card controller is further directly connected to the second SIM card via a third group of signal lines comprising:
        a second power line for providing a second power supply to the second SIM card; and
        a second reset signal line for transmitting a second reset signal provided by the SIM card controller to the second SIM card;
    wherein the SIM card controller provides distinct clock signals, reset signals, and data signals according to the SIM card being accessed by the mobile communication device;
    wherein the switch device is further directly connected to the first SIM card via a fourth group of signal lines comprising:
        a first clock signal line; and
        a first data signal line;
    wherein the switch device is further directly connected to the second SIM card via a fifth group of signal lines comprising:
        a second clock signal line; and
        a second data signal line;
    wherein the switch device is physically and logically disposed between the SIM card controller and the first and second SIM cards.

2. The SIM card control apparatus as claimed in claim 1, wherein a clock signal transmitted on the signal lines is equal to a first clock when the switch device is switched to the first SIM card, and the clock signal transmitted on the signal lines is equal to a second clock when the switch device is switched to the second SIM card.

* * * * *